United States Patent [19]

Balch et al.

[11] 4,266,457
[45] May 12, 1981

[54] COPE CUTTER

[75] Inventors: Robert A. Balch, 2616 SW. Stanley Ct., Portland, Oreg. 97219; Charles E. Kerr, Hillsboro, Oreg.

[73] Assignee: Robert A. Balch, Portland, Oreg.

[21] Appl. No.: 93,843

[22] Filed: Nov. 13, 1979

[51] Int. Cl.³ .............................................. B23D 53/04
[52] U.S. Cl. ........................................ 83/745; 83/813; 83/798; 30/92; 30/380; 144/2 R; 144/134 R
[58] Field of Search .................. 83/54, 581, 745, 796, 83/797, 798, 809, 810, 811, 812, 813, 814, 869; 30/92, 296 R, 380; 144/2 R, 134 R

[56] References Cited

U.S. PATENT DOCUMENTS

| | | | |
|---|---|---|---|
| 2,555,056 | 5/1951 | Pence | 83/798 |
| 2,556,670 | 6/1951 | Ashworth | 83/809 X |
| 2,746,125 | 5/1956 | Cuny | 83/810 |
| 2,855,043 | 10/1958 | Opferkuch | 83/798 X |
| 2,974,694 | 3/1961 | Mattila et al. | 83/745 X |
| 3,385,330 | 5/1968 | Haynes | 83/811 X |
| 3,822,471 | 7/1974 | Crowl | 30/92 |
| 3,881,385 | 5/1975 | Coy | 83/810 X |

*Primary Examiner*—Frank T. Yost
*Assistant Examiner*—Robert P. Olszewski
*Attorney, Agent, or Firm*—Wells, St. John & Roberts

[57] ABSTRACT

A cutter that can be mounted to a workpiece for cutting a cope at a prescribed arc at a selected radius and angle. A support frame mounts a band saw for pivotal movement about a first axis, parallel to the saws cutting flight. The support frame is mounted to a central workpiece clamp for pivotal movement about a second axis that is parallel to the first. The clamp secures the workpiece to the support frame, centered on a plane parallel to the first axis. The saw blade can thus be swung through an arc representing the outside diameter of a second workpiece that is to intersect at a prescribed angle with the clamped workpiece.

11 Claims, 7 Drawing Figures

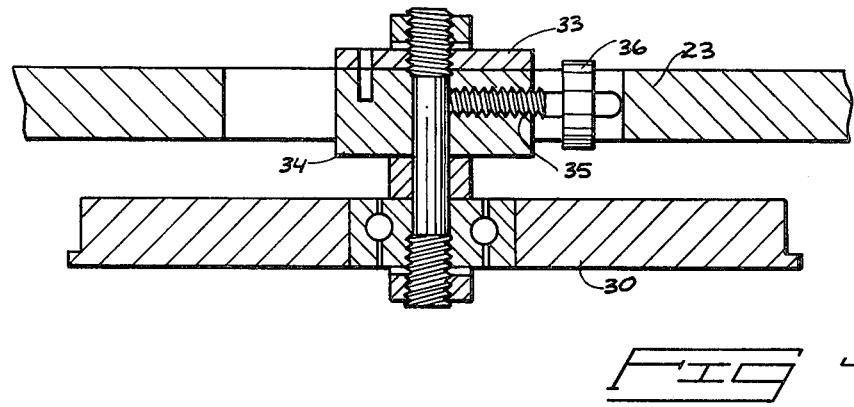
FIG 4
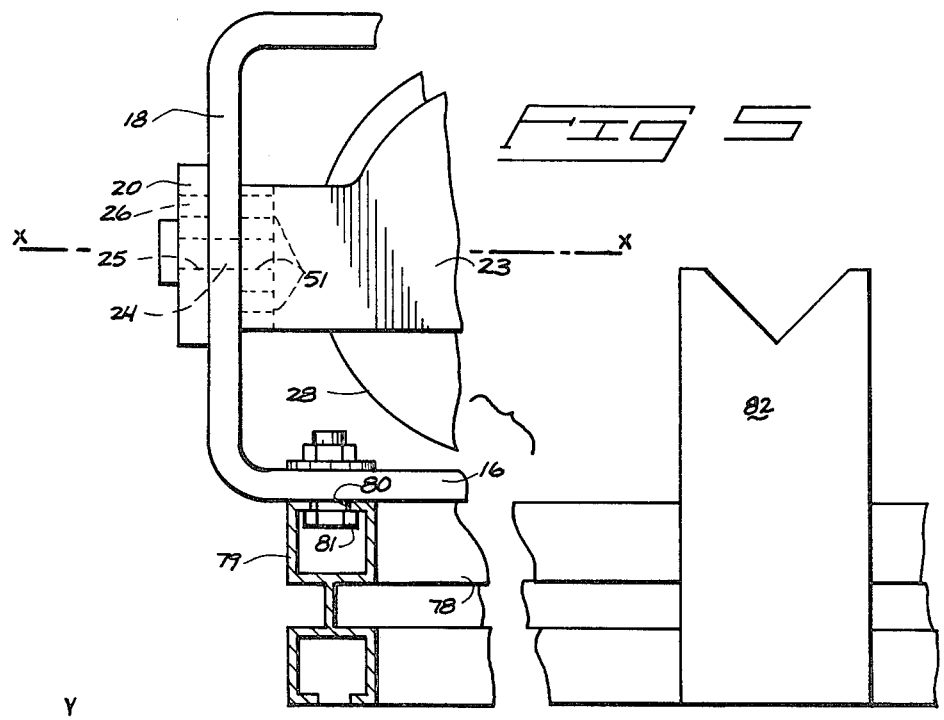
FIG 5
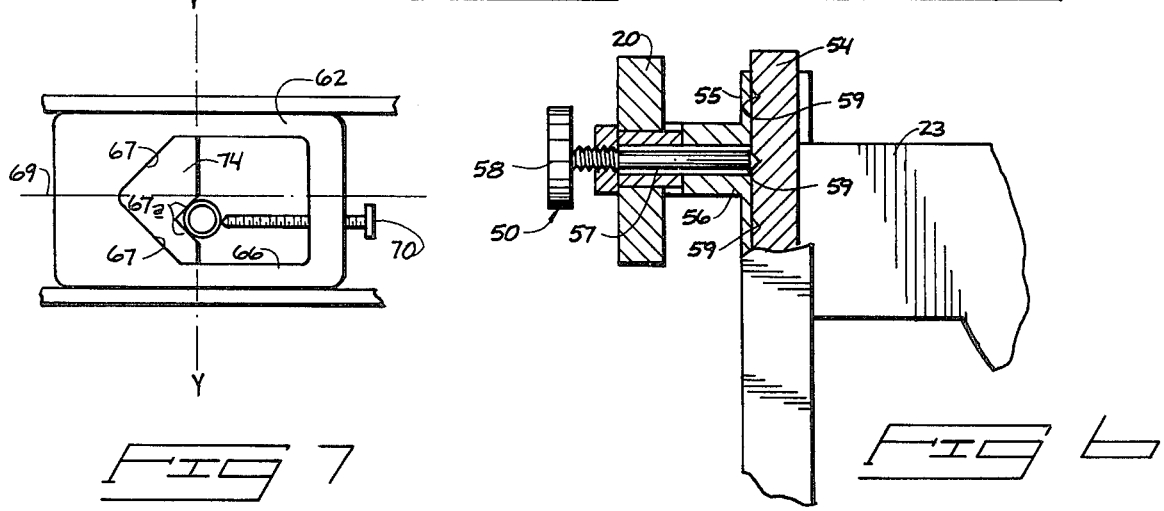
FIG 7
FIG 6

COPE CUTTER

BACKGROUND OF THE INVENTION

The present invention relates to a cope cutting apparatus for producing an arcuate cut having a prescribed radius and arranged at a prescribed angle relative to the longitudinal axis of a workpiece.

It is a difficult task to produce an accurate "cope" or cut surface on a structural member which is to intersect a cylindrical member. This is especially true in construction areas where hollow tubing members are to intersect at angles including compound angles. An end of the intersecting member must be cut to conform with the exterior configuration of the other member to assure that they properly abut one another. A cope must therefore be cut along the end of the intersecting member, or a hole must be formed in the intersected member. The two members will then abut at the desired angle of intersection and can be secured to one another by conventional fastening methods, such as welding.

Occasionally, on-site cope cutting has been accomplished by trial and error, using experience and best judgment as to the cope configuration needed. This method is not effective and can be time consuming if more than one cut has to be made before the final cope configuration is arrived at. Furthermore, this method is wasteful of materials when an erroneous cut can shorten a workpiece below a prescribed length and render it unusable.

Templates have been made to assure accurate cope cutting. These templates are made from detailed drawings, "developing" the proper cope line. The templates are laid on the workpiece and can be traced around or the cope can be cut directly from the template.

The template method is very costly. It usually requires a skilled person to prepare drawings and is a time-consuming task. There is a great chance for error in producing templates through complex and geommetrically imperfect measuring of curved surfaces. Not infrequently, accurate job-site cuts could prevent construction delays encountered when templates or adapters normally used are in error.

U.S. Pat. No. 2,855,043 to Opferkuch shows a compound cutting device using a band saw as the cutting tool. A fixed vise holds the material to be cut on a stationary support frame. The saw is mounted to a frame that swings about a pivot axis. The swinging saw frame is mounted to another frame that is pivoted about a secondary axis. The pivot axes of the two frames allow compound angular positioning of the saw blade and thus allow cutting of compound curvatures on the workpiece. The device is effective in producing finished workpieces having compound surface curvatures. However, the bulky arrangement of swinging frames and support frame render the device impractical as a portable cope cutter. It cannot be supported by the workpiece itself and operated therefrom.

U.S. Pat. No. 2,555,056 to Pence shows a band saw support with a saw pivotally mounted about a first vertical axis to a pair of frame members. The frame members are further pivotally mounted about a second vertical axis. The saw, however, can only be adjusted about the two vertical axes and is therefore incapable of producing a compound angular cut.

U.S. Pat. No. 2,556,670 to Ashworth shows a heavy band saw and frame pivotally mounted to an upright support pedestal. A vise on the pedestal supports the workpiece and the saw is pivoted relative to the pedestal. This device is used for cutting angular surfaces across a workpiece.

The present cope cutter is a small, uncomplicated unit used strictly for forming arcuate copes on a workpiece, especially at the ends of elongated tubing members. The device is entirely portable. It can be fixed to the workpiece and will move relative thereto regardless of the position of the workpiece.

The device includes three basic mounting elements and a band saw held thereby for pivotal movement relative to the workpiece. A clamp member engages the workpiece and holds it centered on a fixed workpiece plane relative to the remaining frame elements. A support frame is pivoted to the clamp about an axis perpendicular to the plane of the workpiece. A saw frame is pivoted to the support frame on an axis that is parallel to the workpiece plane. The saw itself is mounted to the saw frame with its cutting flight arranged parallel to the workpiece. The saw frame is pivoted at opposite sides of the workpiece to insure accuracy of the cope and compactness of the unit. The saw frame can be adjusted on the support frame to swing on a selected radius. The support frame can also be removably mounted to a table or other stationary support.

BRIEF DESCRIPTION OF THE DRAWINGS

FIG. 4 is an enlarged fragmentary detail view of a blade tensioning device;

FIG. 5 is a view showing the cutter mounted to a table support frame;

FIG. 6 is an enlarged fragmentary view showing a radius adjustment for the saw; and FIG. 7 is a fragmentary view illustrating a filler for offsetting the plane of the workpiece.

DETAILED DESCRIPTION OF A PREFERRED EMBODIMENT

Figure 1:
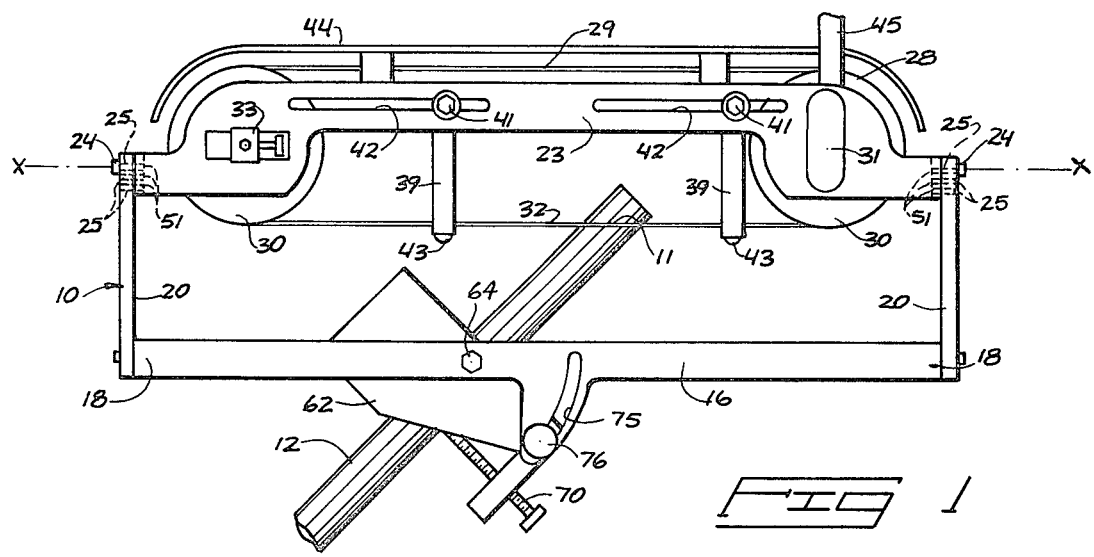
FIG. 1 is a plan view of the device with the clamp frame at an angle to the support frame.

A cope cutter is generally designated in the accompanying drawings by the reference character 10. The present cope cutter 10 is mountable to an enlongated workpiece 12 having a longitudinal central axis for the purpose of forming an arcuate cope 11 across an end thereof.

A "cope" may be defined as a cut surface on one workpiece that is shaped to match or join another surface on a second work piece. A good example is provided at one end of a pipe that intersects the midpoint of a similar pipe length. The end of one pipe or tube must be shaped to match the other at their point of intersection if they are to come into perfect abutment.

The cope cutter 10 is shown in substantial detail in the drawings and includes a basic support frame 16. The frame 16 is comprised of elongated parallel side members 17 that are spaced apart and transversely joined to form a box configuration. The ends of the frame are indicated at 18 and mount outwardly projecting brackets 20. The brackets 20 extend to one side of the support frame. They are bolted or otherwise fixed to the support frame in parallel relation to one another. The support frame 16 and protruding brackets 20 therefore complete a rigid framework having an elongated "U" shaped configuration.

A saw frame 23 is pivotably mounted between the brackets 20. The frame 23 pivots on a first axis X—X (FIG. 1) that is defined by bolts or pins 24. The pins 24 extend through apertures 25 in the brackets 20 to the saw frame 23. Several apertures 25 are provided along each of the brackets 20 as means for radius adjustment that will be described in greater detail below. Other apertures 26 are spaced to the sides of apertures 25 to allow for offset adjustment of axis X—X.

A band saw is shown at 28 mounted to the saw frame 23. The band saw 28 includes an elongated endless blade 29 trained about spaced wheels 30. The wheels are rotatably mounted to the saw frame 23 adjacent brackets 20. One wheel 30 is driven by a motor 31 and will continuously move the saw blade 29 about its endless circuit. The circuit includes a straight cutting flight 32 (FIG. 1) that is defined by wheels 30 to be parallel to the first axis X—X. The cutting swath of the cutting flight about the axis X—X is therefore cylindrical and can duplicate the cylindrical exterior surface configuration of a cylindrical workpiece having a radius equal to the spacing between axis X—X and cutting flight 32.

The cutting flight 32 of blade 29 is held under prescribed tension through a tension adjusting means 33. Adjusting means 33 is situated on the saw frame 23 to selectively space one of the wheels 30 toward or away from the remaining wheel in order to adjust the tension of the interconnecting blade 29. The adjusting means 33 includes a carriage 34 (FIG. 4) carrying the axle stub of the associated wheel 30. The carriage 34 is slidably carried in appropriate tracks or guides on the frame 23 and can be moved back and forth by a threaded bolt 35 engaged therewith. The bolt 35 interconnects the carriage 34 and saw frame 23 and can be turned manually by a knob 36 fixed to the bolt shaft.

A pair of blade guides 39 extend from the saw frame 23 to engage and hold the cutting flight 32 along a straight line. The blade guides 39 are mounted by bolts 41 to the saw frame 23. The bolts 41 extend through elongated slots 42 that are parallel to the cutting flight. The slots 42 and bolts 41 enable selective separation of the blade guides to facilitate operation on workpieces with varying cross-sectional size. Preferably, the blade guides 39 are positioned close to each side of the workpiece to contain the blade 29 on the prescribed radius during the cutting operation.

Guide bearings 43 are situated at outward ends of the guides 39 to contain and train the cutting flight 32 along the straight line.

The blade 29 includes a return flight that is opposite the cutting flight 32. This flight is partially covered by a blade guard 44. The guard 44 is provided as a safety measure to avoid cutting the operator's hands and to contain the saw blade should it break during use. A handle 45 also extends from the saw frame 23 adjacent the blade guard 44 to facilitate hand manipulation of the saw frame about the axis X—X.

Means is provided at 50 for adjusting the radius from axis X—X to the cutting flight 32. Means 50 may be comprised of the pins 24 and apertures 25 in conjunction with similar apertures 51 provided in the saw frame 23. The pins 24 can be selectively removed and reinserted through aligned apertures 25 and 51 (dashed lines, FIGS. 1 and 5) to selectively vary the radius to the cutting flight 32. The apertures 25 and 51 are paired and are spaced apart by distances equal to differences between standard tube or pipe outside radii.

It may on occasion be desirable to offset the first axis X—X to one side of its original position. This can be done by means of the offset pin mounting apertures 26 within the brackets, when aligned with one of the selected apertures 51 on the saw frame 23. The pins 24 can be secured through the aligned apertures 26, 51 to thereby offset the first axis X—X from a normal position where it intersects with the longitudinal center axis of the workpiece.

Another alternate form of adjusting means 50 is shown in detail by FIG. 6. Here, elongated guides 54 are secured to the opposite ends of the saw frame 23. The guides may be "T" shaped in cross section or may include the standard "dovetail" guide configuration. A guideway 55 is supported on each of the brackets 20 to slidably receive the guides 54. Guideways 55 are pivotably mounted to the brackets by projecting sleeves 56. Lock pins 57 threadably engage the hollow sleeves and extend through brackets 20 to engage the guides 54. The lock pins can be manually rotated by turning outer knobs 58 formed integrally at one end of each pin.

The lock pins 57 can be selectively tightened against the guides 54 at any of an infinite number of positions along their lengths. In addition, standard pipe or tube radii can be quickly selected by use of indentations 59 that are spaced along the guides 54. Ends of the lock pins 57 may be received within selected indentations 59, securing the saw frame with the blade cutting flight 32 set at a standard radius from the first pivot axis X—X.

It may be noted here that a similar arrangement to that shown by FIG. 6 can be made to provide the offset feature described above. Offset of the axis X—X can also be accomplished by shifting the workpiece relative to the axis X—X. Apparatus for performing this function will be discussed below in conjunction with a clamp means 62 for mounting the saw and frames to the workpiece.

Figure 2:
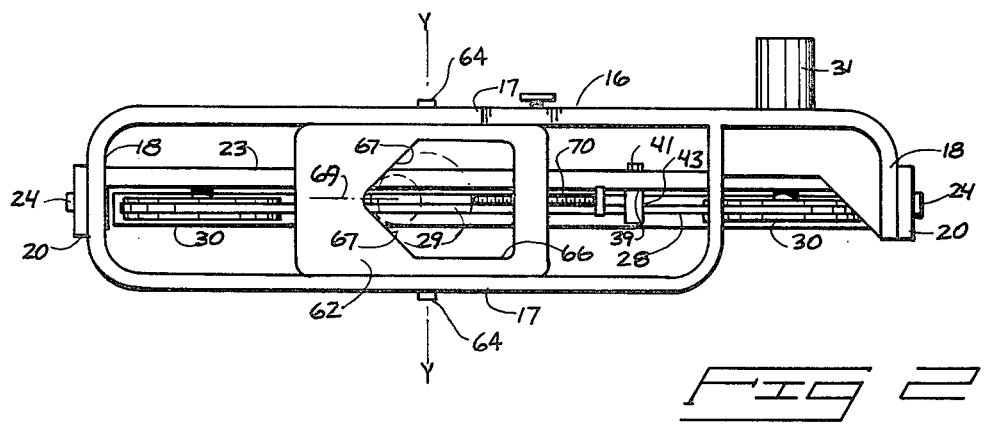
FIG. 2 is a rear elevation of the cutter, showing the clamp frame positioned in alignment with the support frame.
Figure 3:
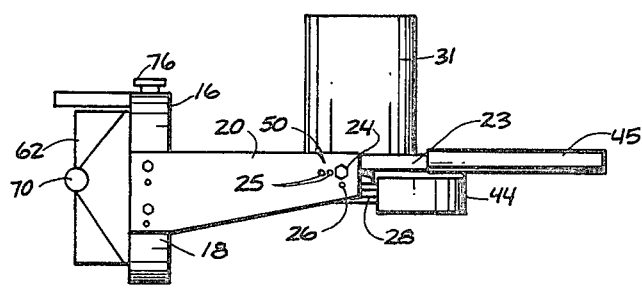
FIG. 3 is an end view of the present cutter as seen from the right in FIG. 2.

The clamp 62 (FIGS. 1 and 2) is situated between the side members 17 of support frame 16 and between the brackets 20. The clamp is comprised of a rigid frame carrying point pins 64 on opposite sides, pivotably communicating with the support frame 16. The pins 54 define a second pivot axis Y—Y that is perpendicular to the first axis X—X. The support frame and saw frame can be positioned about this axis a selected angle between the workpiece axis and the first axis X—X.

The clamp 62 includes a central opening 66 intermediate the pins 64. The opening 66 is partially defined by converging side surfaces 67. These surfaces 67 converge on a plane that bisects the angle between the two surfaces. The plane is indicated by a line 69 in FIG. 2. The first axis X—X is parallel to the plane 69 and the second axis Y—Y is perpendicular thereto. The clamp 62 functions to center the workpiece 12 on the plane 69 and does so by confining the workpiece against the converging surfaces 67.

Clamp screws 70 extend through the clamp frame on an opposite side of the opening from the converging side 67. The screws 70 may be selectively tightened through threadable engagement with the clamp to urge the workpiece 12 against the converging sides 67. The workpiece will slide over one converging side surface 67 until it contacts the opposite surface. One side 67 will engage and slide the workpiece up or down until the other side 67 comes into engagement with the workpiece. The central, longitudinal axis of the workpiece will thus be centered on plane 67 by operation of the sides 67 and clamp screws 70.

FIG. 7 shows an alternate means for offsetting the saw axis X—X from the workpiece axis. A filler 74 is fitted into the opening, having sides mating with the converging opening sides 67. The filler 74 also has converging sides 67a facing the clamp screws 70. The sides 67a converge on a plane that is offset from the plane 69 and so will center a workpiece with its axis offset from the normal plane 69. The filler 74 can be inverted to locate the workpiece in either of two planes spaced from the normal plane 69. Fillers can also be used to contain other shapes of workpieces.

Selective angular adjustment of the support frame 16 on the clamp 62 is provided by means of an adjusting slot 75 on the support frame 16 and a clamp bolt 76. The bolt 76 extends through the adjusting slot 75 to threadably communicate with the clamp 62. The slot 75 is formed on a radius from the pivot axis Y—Y to permit limited pivotal adjustment of the support frame about that axis. The clamp bolt 76 can be selectively tightened or loosened to secure or release the support frame relative to the clamp. Indicia (not shown) can be provided along the support frame 16 adjacent slot 75 to assist in accurately indexing the frame at a desired angle relative to the axis of the workpiece 12. It is noted also that an arrangement similar to the pin and detent arrangement for the radius adjusting means 50 could also be utilized between the support frame 16 and clamp 62. In this instance, detents would be provided at various selected angles representing standard angular intersection of workpieces, such as 30, 45 and 60 degrees.

FIG. 5 shows the support frame 16 mounted to a fragmentary section of a table mount frame 78. The complete frame 78 is preferably rectangular with longitudinal sides 79. These sides are preferably formed of an extruded metal such as alumium with included guideways 80. The ways 80 receive the headed ends of lock bolts 81 that, in turn, threadably communicate with the support frame 16. Selective tightening of the lock bolts will secure the support frame 16 and elements engaged thereby relative to the support frame. The table mount frame 78 also includes auxiliary work supports 82 or clamp members that are centered relative to the clamp 62 so the axis of the workpiece will be held within the plane 69. The table mount frame 78 can readily be secured to any desired support or work bench. The frame 78 simply functions to assist the clamp 62 in holding the workpiece and remaining elements of the cutter in selected relative positions.

It is believed from the above technical description that operation of the present invention can now be easily understood. Such description will be made in reference to a workpiece of circular cross section such as a tube, pipe, or conduit which is to intersect with a second workpiece (not shown) at a prescribed angle of 45°. For the purpose of describing this operation, the intersecting workpieces will be assumed to have equal outside diameters of 3".

To initiate operation of the present invention, the operator must first secure the cope cutter to the tube. He does this simply by inserting an end of the tube through the opening 66 of the clamp 62. The surface area to be cut is positioned on the side of the support frame 16 to which the brackets 20 project. The tube is also supported by the auxiliary supports 82 if the table support frame is used.

It is pointed out that the area to be cut may either extend across the entire end of the workpiece, or may be situated on one side thereof.

When the clamp and workpiece have been properly oriented the clamp screws 70 may be tightened. This action forces the workpiece into engagement with the converging surfaces 67. The surfaces will therefore center the central, longitudinal axis of the workpiece on the plane 69. This secures the workpiece and enables further relative positioning of the remaining elements to produce a desired cope across the workpiece.

The next step following mounting of the workpiece to the cope cutter involves proper positioning of the blade relative to the axis X—X to match the radius of the intersected workpiece. In this example, the radial distance from axis X—X to the cutting flight 32 will be one and one-half inches. The pivoted path of the cutting flight will therefore describe an arc coincidental with the curvature of the intersected pipe.

At this point, if desired, the axis of intersection (axis X—X) can be offset from the axis of the intersected workpiece simply by shifting the saw frame on the brackets, using the offset apertures 26. The offset can also be accomplished using the filler 74 before securing the tube to the clamp means.

The support frame 16 can be set about the axis Y—Y to angularly position the X—X axis relative to the tube axis. This angle corresponds with the desired angle of intersection between the two tubes. When the proper angle is set, the clamp bolt 76 is tightened to secure the support frame in position.

The saw can then be started. The cut can be made by swinging the cutting flight on axis X—X across the engaged workpiece. The path of the cutting flight 32 will follow the exact curvature of the intersected tube, cutting through the intersecting tube and forming the desired cope.

The above description and attached drawings are given by way to set forth a preferred form of the invention. Other alternate forms are also envisioned within the scope of the following claims.

What we claim is:

1. A cutter for forming an arcuate cope on a workpiece, comprising:
   an elongated support frame;
   brackets located at opposite ends of the support frame and extending to one side thereof;
   a saw frame mounted to the brackets for pivotal movement about a first axis on the one side of the support frame;
   a band saw on the saw frame having a saw blade with its cutting flight arranged parallel to the first axis; and
   clamp means pivotally mounted to the support frame intermediate the brackets about a second axis perpendicular to the first axis, for centering a workpiece in a plane parallel to the first axis, with the workpiece projecting to the one side of the support frame and physically intersecting the pivotal path of the band saw cutting flight about said first axis.

2. The cutter as defined by claim 1 further comprising adjusting means for selectively varying the radial distance from the first pivot axis to the cutting flight of the band saw.

3. The cutter as defined by claim 1 further comprising support frame adjusting means for securing the support frame at a selected angular position on the second pivot axis relative to the workpiece.

4. The cutter as defined by claim 1 further comprising offset adjusting means for selectively setting the first pivot axis at a selected distance from the plane of the workpiece.

5. The cutter as defined by claim 1 wherein the band saw blade is trained over a pair of wheels to define the cutting flight thereof;
means for rotating the wheels;
wherein the saw frame mounts the wheels for rotation about parallel wheel axes that are spaced to opposite sides of the workpiece; and
blade tension adjusting means on the saw frame for selectively applying tension to the cutting flight of the blade.

6. The cutter as defined by claim 1 further comprising:
blade guide means on the saw frame intermediate the brackets for engaging and holding the blade in a straight line; and
blade guide adjusting means mounting the blade guides to the saw frame for selectively positioning the blade guides on opposite sides of the workpiece.

7. The cutter as defined by claim 1 further comprising:
a table mount frame for movably mounting the saw frame on a table top; and
lock means connecting the saw frame and table mount frame for securing the saw frame in a stationary position relative to the table mount frame.

8. The cutter as described by claim 1 further comprising:
a table mount frame for movably mounting the saw frame on a table top;
lock means connecting the saw frame and table mount frame for securing the saw frame in a stationary position relative to the table mount frame; and
a secondary workpiece clamp means on the table mount frame for securely holding the workpiece relative to the table mount frame and saw frame.

9. The cutter as defined by claim 1 further comprising adjusting means for selectively varying the radial distance from the first pivot axis to the cutting flight of the band saw, including a detent mechanism for setting the radial blade to first axis distance at any one of several selected standard distances and a clamp mechanism for setting the radial blade to first axis distance at any selected distance between the standard distances.

10. A cutter for forming an arcuate cope on an elongated tubular workpiece having a longitudinal central axis, comprising:
an elongated support frame spanning a distance between ends greater than the cross-sectional dimension of the workpiece;
brackets located at the ends of the support frame and extending to one side thereof;
a saw frame mounted between the brackets on the one side of the support frame for pivotal movement about a first axis;
a band saw on the saw frame having an endless blade with its cutting flight arranged parallel to the first axis on the one side of the support frame;
clamp means pivotally mounted to the support frame between the ends thereof about a second axis perpendicular to the first axis, fixing the support frame to the workpiece with one end projecting to the one side of the support frame for centering the longitudinal axis of the tubular workpiece in a plane parallel to the first axis.

11. A cutter for forming an arcuate cope on an elongated cylindrical workpiece having a longitudinal central axis, as set out by claim 10 wherein the clamp means is comprised of:
a clamp frame having a central opening for receiving the workpiece longitudinally therethrough;
one side of the clamp frame opening being defined by clamp surfaces and converging on the plane for tangentially engaging cylindrical surfaces of the workpiece; and
a clamp screw threadably engaging the clamp frame opposite the one side and extending into the opening to engage and clamp the workpiece against the converging surfaces and locate the longitudinal axis thereof on the plane at the angularly converging clamp surfaces.

* * * * *